United States Patent [19]
Suga et al.

[11] Patent Number: 5,450,870
[45] Date of Patent: Sep. 19, 1995

[54] METHOD AND AN APPARATUS FOR DETECTING CONCENTRATION OF A CHEMICAL TREATING SOLUTION AND AN AUTOMATIC CONTROL APPARATUS THEREOF

[75] Inventors: Makoto Suga; Masashi Niwa, both of Nagoya; Fumio Kojima, Chiryu; Nobumasa Ishida; Koji Kondo, both of Chiryu, all of Japan

[73] Assignee: Nippondenso Co., Ltd., Kariya, Japan

[21] Appl. No.: 162,187

[22] PCT Filed: Apr. 16, 1993

[86] PCT No.: PCT/JP93/00486

§ 371 Date: Dec. 16, 1993

§ 102(e) Date: Dec. 16, 1993

[87] PCT Pub. No.: WO93/21359

PCT Pub. Date: Oct. 28, 1993

[30] Foreign Application Priority Data

Apr. 17, 1992 [JP] Japan .................. 4-98154
May 29, 1992 [JP] Japan .................. 4-138950

[51] Int. Cl.⁶ .................................. G05D 11/08
[52] U.S. Cl. ............................... 137/3; 137/93
[58] Field of Search ........................ 137/3, 93

[56] References Cited

U.S. PATENT DOCUMENTS

| | | | |
|---|---|---|---|
| 3,060,950 | 10/1962 | Hijmans | 137/3 |
| 4,315,518 | 2/1982 | Sawyer | 137/93 X |
| 4,372,666 | 2/1983 | Kaufman | 137/93 X |
| 4,464,315 | 8/1984 | O'Leary | 137/93 X |
| 5,253,379 | 10/1993 | Dusamos et al. | 137/93 X |
| 5,340,468 | 8/1994 | Hawthorne et al. | 137/3 X |

FOREIGN PATENT DOCUMENTS

| | | |
|---|---|---|
| 53-131963 | 11/1978 | Japan . |
| 58-161758 | 9/1983 | Japan . |
| 59-35666 | 2/1984 | Japan . |
| 61-199069 | 9/1986 | Japan . |
| 1147707 | 6/1989 | Japan . |
| 2254181 | 10/1990 | Japan . |
| 427417 | 1/1992 | Japan . |

*Primary Examiner*—Stephen M. Hepperle
*Attorney, Agent, or Firm*—Cushman Darby & Cushman

[57] ABSTRACT

According to the present invention, the changing rate of the predetermined component concentration is determined, based on the difference between the predetermined component concentration in a chemical treating solution (a plating solution) which is analyzed this time and the predetermined component concentration analyzed last time, both measured by an analytical means, and the difference of each sampling time for analysis of each component concentration by the analytical means (140). Subsequently, the correction amount for the analyzed result of this time based on the changing rate obtained above and the elapsed time from the sampling point of time of the plating solution of this time for analysis of the plating solution by the analytical means to the current point of time (150), and then the analyzed result is corrected based on the resulting correction amount to compute or calculate the current concentration (160). As the result, the current concentration can be detected accurately regardless of the analyzing time of the plating solution by the analytical means.

11 Claims, 13 Drawing Sheets

FIG. 9A Cu CONCENTRATION
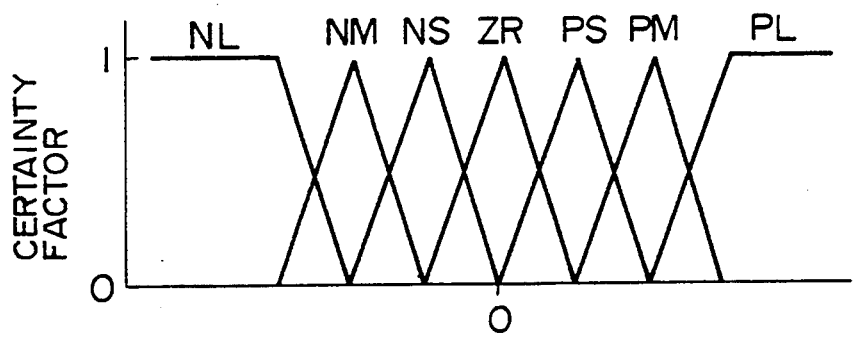
FIG. 9B CHANGING AMOUNT OF Cu CONCENTRATION
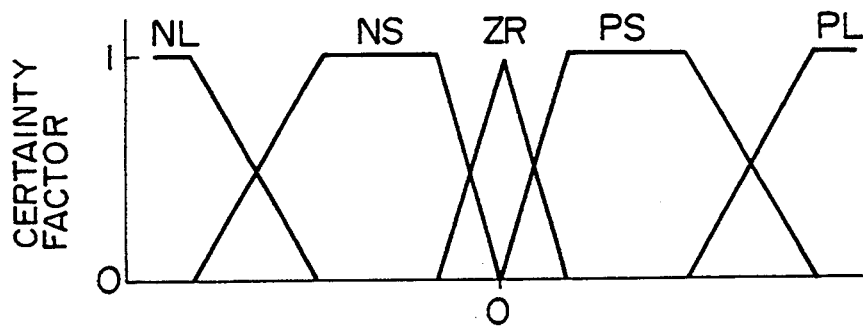
FIG. 9C CURRENT SUPPLY RATE OF Cu
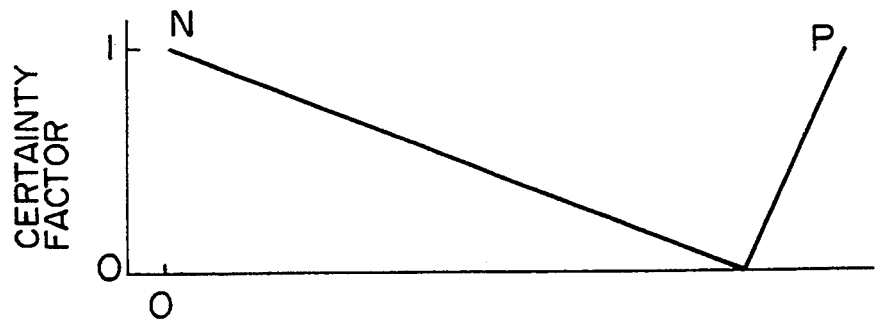
FIG. 9D Cu SUPPLY RATE
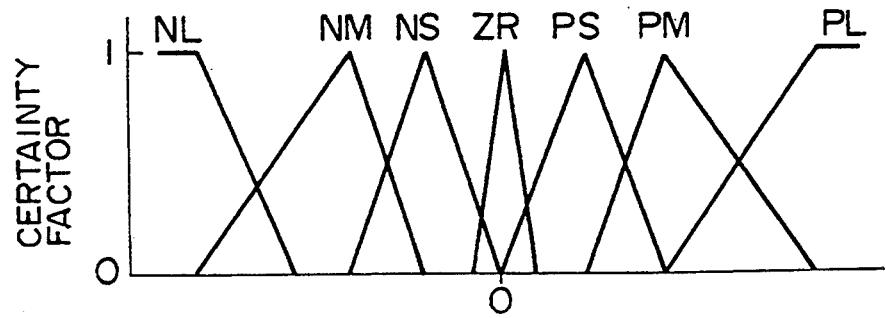

FIG. 10A NaOH CONCENTRATION
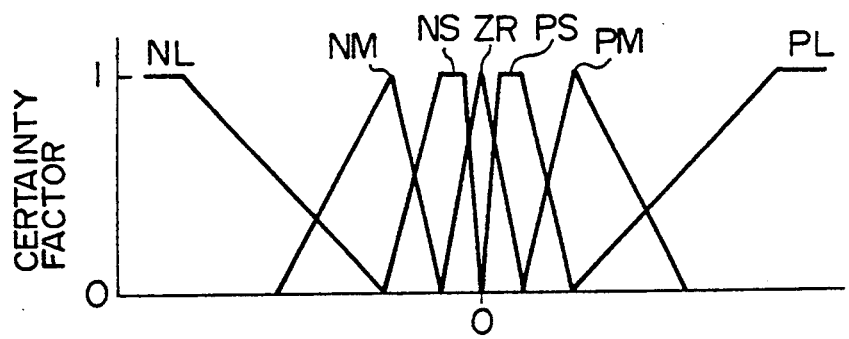
FIG. 10B CHANGING AMOUNT OF NaOH CONCENTRATION
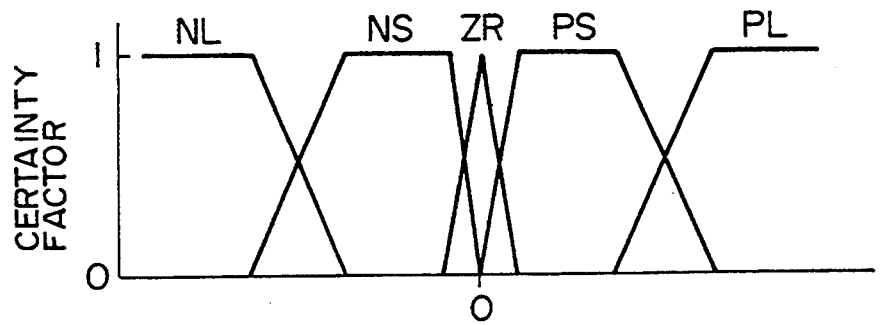
FIG. 10C CURRENT SUPPLY RATE OF NaOH
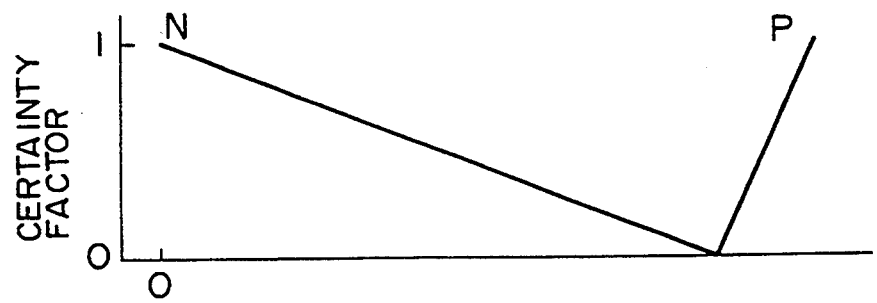
FIG. 10D NaOH SUPPLY RATE
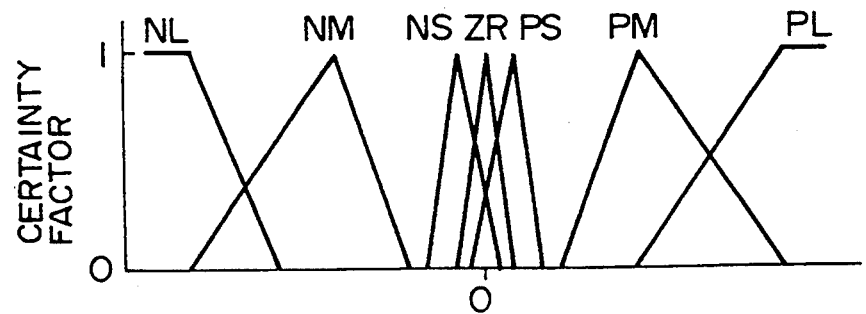

FIG. IIA  HCHO CONCENTRATION
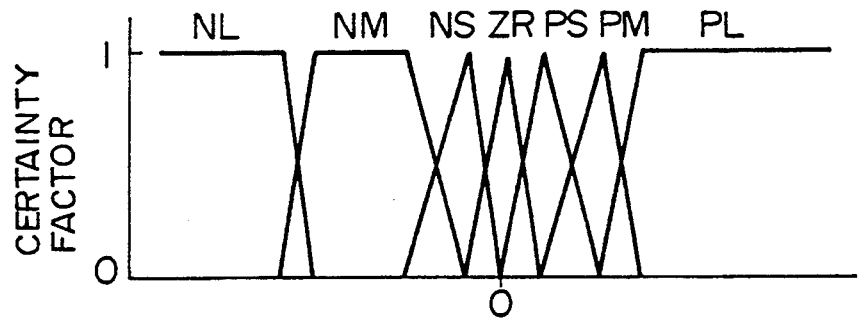
FIG. IIB  CHANGING AMOUNT OF HCHO CONCENTRATION
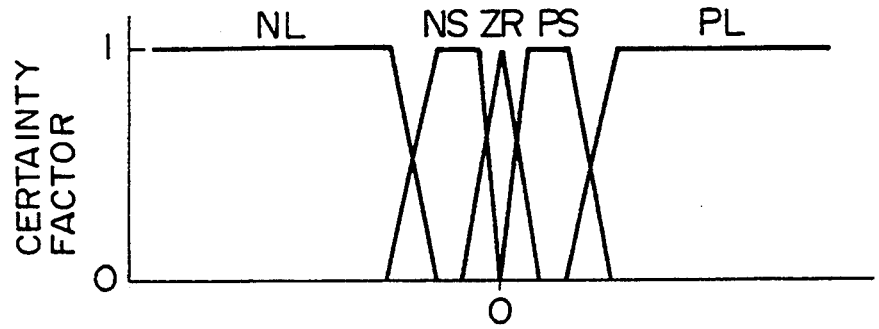
FIG. IIC  CURRENT SUPPLY RATE OF HCHO
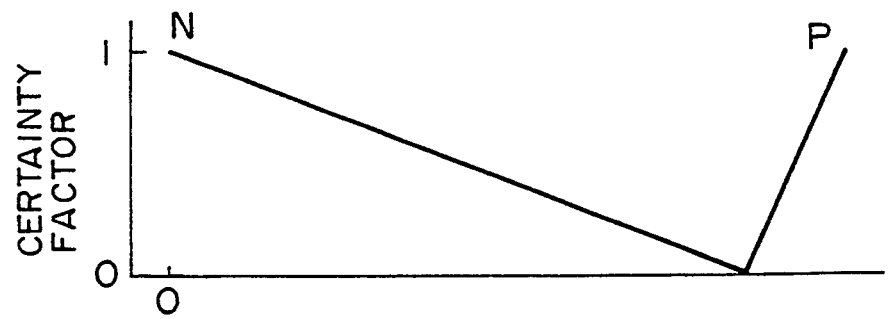
FIG. IID  HCHO SUPPLY RATE
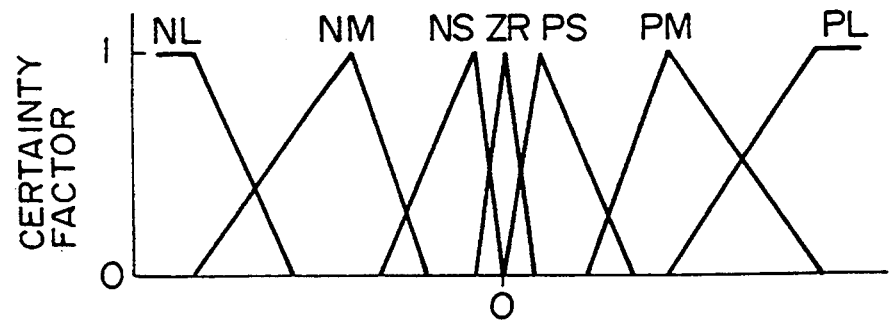

METHOD AND AN APPARATUS FOR DETECTING CONCENTRATION OF A CHEMICAL TREATING SOLUTION AND AN AUTOMATIC CONTROL APPARATUS THEREOF

FIELD OF THE INVENTION

The present invention relates to a method and an apparatus for detecting concentration of a chemical treating solution used for chemical treatment such as plating and etching, by which concentration of the predetermined component contained in the chemical treating solution can be detected, and to an automatic control apparatus of the chemical treating solution, by which concentration of the predetermined component in the chemical treating solution can be controlled to the command concentration according to the detected result by the concentration detecting apparatus.

BACKGROUND OF THE INVENTION

As the apparatus for automatic control of the concentration of a chemical treating solution, there has been known an apparatus which analyzes the concentration of the predetermined component consumable by the chemical treatment in a chemical treating solution and, when the concentration is detected to be lower than the command concentration based on the analyzed result, automatically supplies a replenisher in a required amount in order to restore the concentration to the predetermined concentration. Another apparatus has also been known which not only computes or calculates the consumed amount per unit time of a component in a chemical treating solution on the basis of the surface area of material to be chemically treated to supply the loss of the component, but also analyzes the component in the chemical treating solution continuously to control the supply amount of the component based on the degree of the concentration (Japanese Patent Application Laid-open No. 199069/1986).

In the former apparatus described above, however, the replenisher to be supplied is added in a required amount after sampling the chemical treating solution, analyzing the concentration of the predetermined component in the chemical treating solution, and further detecting that the concentration has become lower than the predetermined concentration from the analyzed result. Therefore, a time lag from sampling of the chemical treating solution to addition of the replenisher occurs, which is a problem of the apparatus.

That is, for example, in case where electroless copper plating is carried out as a chemical treatment, sodium hydroxide and formalin as a reducing agent in a plating solution as a chemical treating solution reduce copper ion into metal copper to deposit copper plating. As a result, the concentrations of the three components decrease gradually while progressing with the plating reaction. Accordingly, in the above former apparatus, each concentration of the three components is analyzed independently and then loss of each component is supplied based on the analyzed result in electroless copper plating. In this case, if the concentration analysis of each component is carried out by a conventional analytical method in which the concentration of sodium hydroxide is firstly determined by titration, next the copper concentration is determined by absorption spectroscopy, and finally the formalin concentration is determined by titration, it would take as much as 15 to 30 minutes for the analysis. Therefore, the time lag over 15 to 30 minutes would occur in the period from sampling of a plating solution as a chemical treating solution to addition of the replenisher.

Therefore, in the above former apparatus, the analyzed result and the actual concentration at the replenisher-adding point of time are sometimes different largely from each other, which results in a problem that the concentration of the predetermined component in the chemical treating solution can not be accurately controlled to the command concentration by addition of replenisher. Such a problem might cause a serious disturbance on the precise control of concentration of the chemical treating solution to within a narrow range as possible and on the uniformity of physical properties of a plated film formed on material to be treated by the chemical treatment and treating rate. On the other hand, the above latter apparatus is one which calculates the consumed amount per unit time of the predetermined component in the chemical treating solution based on the deposition amount per unit time of the treated film calculated on the basis of the surface area of the material to be treated, under certain chemical treating solution compositions and certain treatment conditions, and then supplies the predetermined component in an amount corresponding to the consumption into the chemical treating solution. Therefore, in that apparatus, the time lag as observed in the above former apparatus does not occur. Furthermore, in case where the concentration of the chemical treating solution is maintained at the predetermined control concentration and it is needless to adjust the amount of replenisher, constant concentration control constant to some extent is possible by using the apparatus.

However, in such apparatus, it is required to analyze the concentration of the predetermined component in order to confirm whether the concentration of the chemical treating solution is maintained at the predetermined control concentration or not. When it is confirmed that the concentration of the chemical treating solution is not maintained at the predetermined control concentration, a control such as stopping to supply the replenisher, reduction in supply amount of the replenisher or increase in supply amount of the replenisher, or a control in which another kind of replenisher is added should be carried out.

Accordingly, in such controls, after all, the time lag from analysis of the chemical treating solution to addition of replenisher occurs like the above former apparatus. Furthermore, there also occur another problem that the concentration of the chemical treating solution can not be maintained within the predetermined narrow range and that physical properties of plated film formed on material to be treated by the chemical treatment and the treating rate can not be make uniform.

In addition, such apparatus is useful only under certain chemical treating solution compositions and treatment conditions. Therefore, when the treatment conditions such as surface area of material to be treated are different, the control rule to be employed should be changed depending on the conditions, which result in a problem that the control is troublesome.

Furthermore, the conventional apparatuses described above assume their use to be in the case of relatively low chemical treating rates, for example, where it takes about 20 hours for treatment, in which change in concentration of each component is small and the supply amount accompanied by the change is also small.

Therefore, in this case, such apparatuses can be utilized usefully to some extent. However, in case of relatively high chemical treating rates, for example, where it takes about 2 hours for treatment, the reaction of the chemical treatment is fast and the change in concentration is large. In this case, such apparatuses could not be utilized at all.

That is, for example, in the conventional electroless copper plating in which the plating time is by 20 hours, the plating deposition rate is 1 to 2 $\mu m$ per 1 hour, which is low speed. In this case, the time lag owing to analyzing time of plating solution is not so serious problem. On the other hand, in a high speed electroless copper plating in which the plating time is 2 hours, the plating deposition rate is 15 to 20 $\mu m$ per 1 hour, which is high speed. In this case, the analyzing time of plating solution (15 to 30 minutes) becomes a serious problem.

The present invention is accomplished in view of these problems. The present invention provides a method for detecting concentration of a chemical treating solution, in which the concentration of the predetermined component in the chemical treating solution at the current point of time can be accurately detected constantly without influence by analyzing time; and provides an automatic control method for a chemical treating solution using said concentration detecting apparatus, which is suitable for controlling the concentration of the chemical treating solution.

SUMMARY OF THE INVENTION

The present invention can provides a method for detecting concentration of a chemical treating solution, in which the chemical treating solution is sampled at two analytical stages to analyze the first information concerning concentration (hereinafter, referred to as "the first concentration information") corresponding to the first concentration of the predetermined component in the chemical treating solution at the first analyzing point of time and the second information concerning concentration (hereinafter, referred to as "the second concentration information") corresponding to the second concentration of said predetermined component in the chemical treating solution at the second analyzing point of time when the predetermined time has elapsed from the first analyzing point of time; then the concentration of said predetermined component in the chemical treating solution, where the predetermined time has elapsed from said second analyzing point of time, is computed or calculated based on the concentration information given by the analysis and the times required for said first and second analyses.

In addition, the present invention can provides a concentration detecting apparatus for a chemical treating solution, which comprises:
an analytical means in which the chemical treating solution is sampled at two analyzing stages to analyze the first concentration information corresponding to the first concentration of the predetermined component in the chemical treating solution at the first analyzing point of time and the second concentration information corresponding to the second concentration of said predetermined component in the chemical treating solution at the second analyzing point of time when the predetermined time has elapsed from the first analyzing point of time; and
a concentration calculating means which calculates the concentration of said predetermined component in the chemical treating solution, where the predetermined time has elapsed from said second analyzing point of time, based on the concentration information given by the analysis and the times required for said first and second analyses.

Further, the present invention also provides an automatic control apparatus for a chemical treating solution, as shown in a block diagram of FIG. 1, which comprises:
a concentration detecting means composed of: an analytical means in which a chemical treating solution is sampled periodically to analyze the concentration of the predetermined component in the chemical treating solution; a changing rate calculating means which calculates the changing rate of concentration of the predetermined component in said chemical treating solution, based on the difference between the first concentration of said predetermined component and the second concentration of said predetermined component measured at the point of time when the predetermined time has elapsed from the first concentration analyzing point of time, which both are given by the analytical means and the time difference between the first time required for sampling from said chemical treating solution to determine said first concentration and the second time required for sampling from said chemical treating solution to determine said second concentration; a changing amount calculating means which calculates the third concentration at the third predetermined point of time where the predetermined time has elapsed from said second predetermined point of time, based on the changing rate given by the changing rate calculating means and the time difference between said second predetermined point of time and said third predetermined point of time; and a correcting means which outputs the result of the third concentration at said third predetermined point of time, which is calculated by the changing amount calculating means, as said predetermined component concentration into said chemical treating solution; and detects the second concentration information of the predetermined component consumed by the chemical treatment in the chemical treating solution contained in a chemical treatment vessel;
a supply means which supplies the predetermined component to be detected its concentration by the concentration detecting means into the chemical treatment vessel described above as a replenisher;
a control amount calculating means which calculates supply rate or supply amount of the replenisher by said supply means, based on the second concentration of the predetermined component calculated by said changing mount calculating means and said third concentration of the predetermined component calculated by said changing amount calculating means; and
a supply control means which drive-controls said supply means depending on the supply rate or the supply amount calculated by the control amount calculating means.

Even further, the present invention provides an automatic control method for a plating solution, which detects the first concentration information corresponding to the first concentration of the predetermined component in a chemical treating solution at the first analyzing point of time and the second concentration information corresponding to the second concentration of said predetermined component in the chemical treating solution at the second analyzing point of time when the predetermined time has elapsed from the first analyzing point of time; memorizes plural rules set based on said first concentration information and said second concentration information and functions not only partitioning said first concentration information and second concentration information in said plural rules into sets having the predetermined ranges but also setting the certainty factors in the partitioned sets; operating each certainty factor in said plural rules; setting the command value of the concentration of said predetermined component in said third chemical treating solution based on the certainty factor; and supplies said predetermined component into said chemical treating solution according to the command value of said third concentration.

Furthermore, the present invention provides a concentration detecting apparatus for a chemical treating solution comprising:

an analytical means which detects the first concentration information corresponding to the first concentration of the predetermined component in a chemical treating solution at the first analyzing point of time and the second concentration information corresponding to the second concentration of said predetermined component in the chemical treating solution at the second analyzing point of time when the predetermined time has elapsed from the first analyzing point of time;

a memory means which memorizes plural rules set based on said first concentration information and said second concentration information so that the third concentration of the predetermined component in the chemical treating solution where the predetermined time has elapsed since said second analysis can be given and functions not only partitioning said first concentration information and second concentration information in said plural rules into sets having the predetermined ranges but also setting the certainty factors in the partitioned sets; and a setting means which operates each certainty factor in said plural rules and sets the command value of the concentration of said predetermined component in said third chemical treating solution based on the resulting certainty factors.

Finally, the present invention provides an automatic control apparatus for a chemical treating solution, as shown in a block diagram of FIG. 2, comprising:

a supply means which supplies each component in a chemical treating solution consisting of plural components independently as a replenisher into a chemical treating vessel containing the chemical treating solution therein;

a condition input means which memorizes command concentration of each of said replenishers in said chemical treating solution and chemical treatment conditions for material to be chemically treated;

a control amount calculating means which calculates supply rate or supply amount of said each replenisher to be supplied by said supply means, based on said command concentration of each said replenisher in the chemical treating solution and the chemical treatment conditions for the material to be chemically treated, which both memorized in said condition input means;

a supply means which controls the supply rate or the supply amount of each replenisher from said supply means into said chemical treatment vessel depending on the supply rate or the supply amount calculated by the control amount calculating means;

a concentration analyzing means which analyzes concentration of said each replenisher in said chemical treating solution vessel independently;

a concentration changing amount calculating means which calculates changing amount per unit time of each replenisher concentration based on the analyzed results by the concentration analyzing means;

a memory means which memorizes plural rules set based on deviation between the concentration of each replenisher analyzed by said concentration analyzing means and the command concentration, changing amount of each replenisher concentration calculated by said concentration changing amount calculating means and correction amount of supply rate or supply amount of said each replenisher, and functions not only partitioning the deviation between the concentration of each replenisher analyzed by said concentration analyzing means and the command concentration, the changing amount of each replenisher concentration calculated by said concentration changing amount calculating means and the correction amount of the supply rate or the supply amount of said each replenisher in said plural rules into sets having predetermined ranges but also setting certainty factors in the partitioned sets;

a correction amount calculating means which operates each certainty factor in said plural rules and then calculates the correction amount of supply rate or supply amount of said each replenisher based on the resulting certainty factor; and a control amount update means which corrects the supply rate or the supply amount calculated by said control amount calculating means based on the correction amount set by said correction amount calculating means to change the supply rate or the supply amount of each replenisher to be controlled by said supply control means.

According to above the constitutions of the present invention, since the concentration of the predetermined component in the chemical treating solution, where the predetermined time has elapsed from the second analyzing point of time, is calculated based on the first concentration information and the second concentration information, the concentration of the predetermined component in the chemical treating solution can be calculated accurately without influence of the analyzing time.

In addition, according to the present invention, since the third concentration is calculated by partitioning the plural rules, setting the certainty factors in the partitioned sets and then operating each certainty factor in the rules, the third concentration can be calculated more accurately.

BRIEF DESCRIPTION OF THE DRAWINGS

FIG. 8 is a flowchart showing the supply rate control processing executed in CPU 20a;

FIGS. 9A to 9D are graphs showing membership functions concerning the replenisher Cu stored in ROM 20b;

FIGS. 10A to 10D are graphs showing membership functions concerning the replenisher NaOH stored in ROM 20b;

FIGS. 11A to 11D are graphs showing membership functions concerning the replenisher HCHO stored in ROM 20b;

DETAILED DESCRIPTION OF THE PRESENTLY PREFERRED EMBODIMENT (Example 1)

Figure 1:
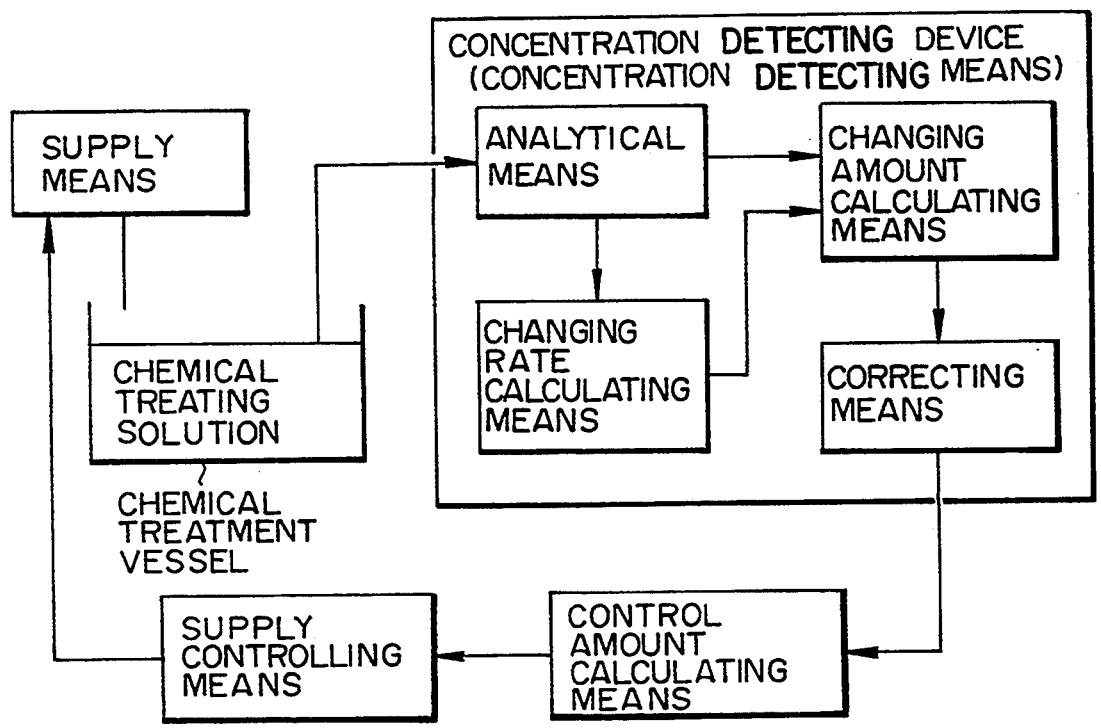
FIG. 1 is a block diagram illustrating the constitution of Example 1.
Figure 2:
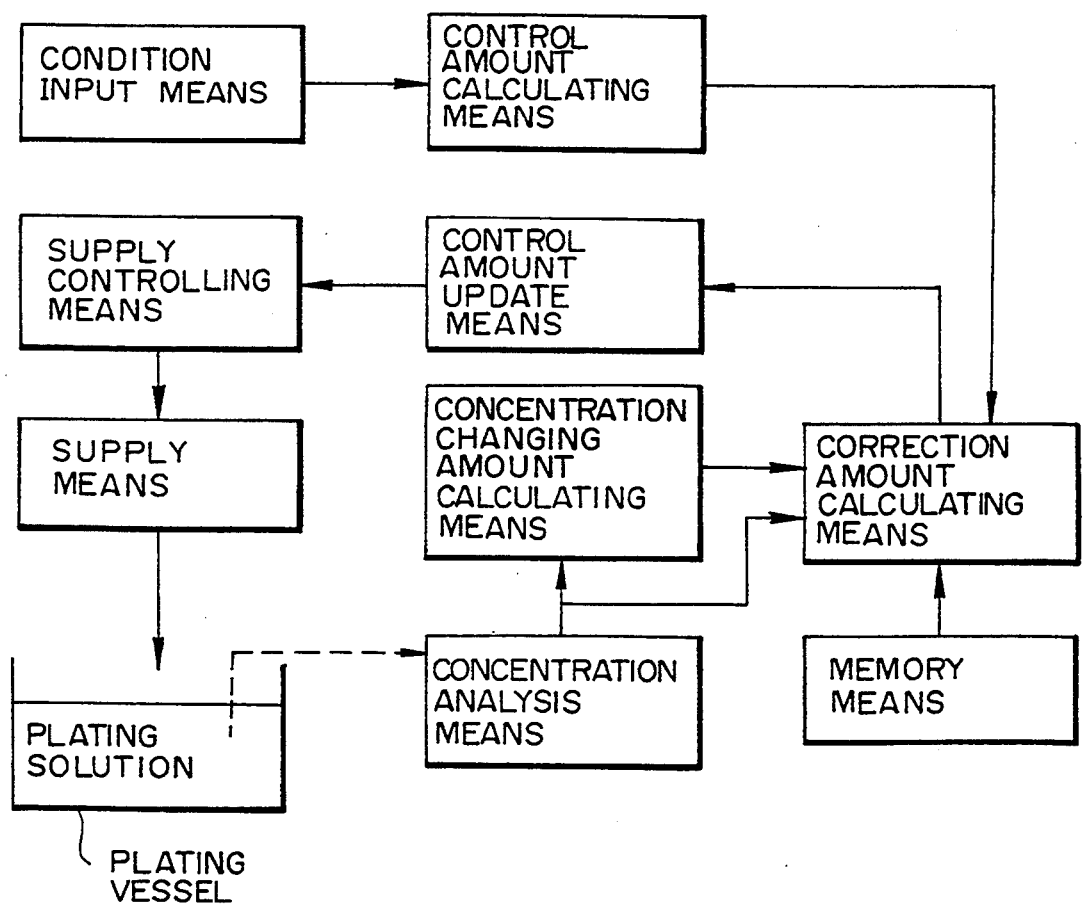
FIG. 2 is a block diagram illustrating the constitution of Example 2.
Figure 3:
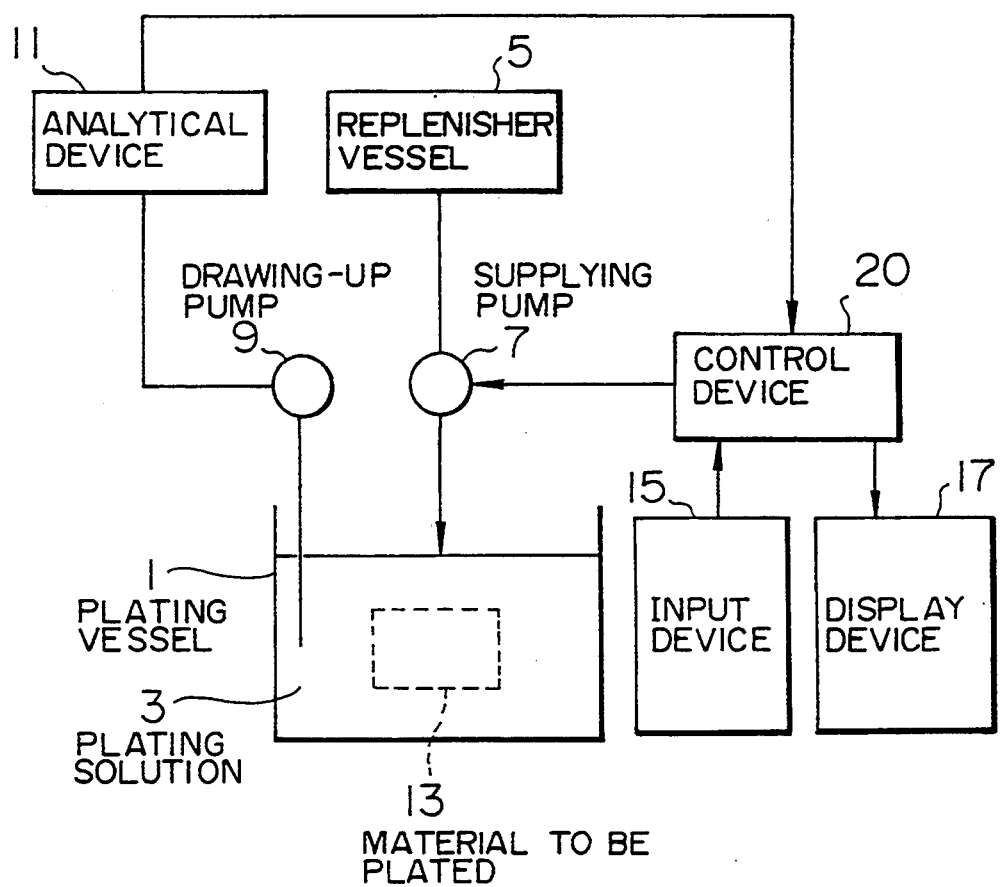
FIG. 3 is a schematic constitutional diagram showing the general constitution of the automatic control apparatus for plating solution of an embodiment.

Example 1 of the present invention is illustrated taken in conjunction with the accompanying drawings as follows:

At first, FIG. 3 is a schematic constitutional diagram showing the general constitution of the automatic control apparatus for plating solution of an embodiment, by which the concentration of a plating solution, i.e. a chemical treating solution, is controlled automatically.

As shown in FIG. 3, the automatic control apparatus of the present embodiment is one used for controlling the concentrations of the components consumable by plating in electroless copper plating solution 3, i.e., copper (Cu), sodium hydroxide (NaOH) and formalin (HCHO), in a plating apparatus wherein plating is carried out using the plating solution 3 contained in plating vessel 1 as a chemical treatment vessel. The apparatus is composed of: replenisher vessel 5 containing each of above the components as a replenisher; supply pump 7 as a supply means for supplying each replenisher Cu, NaOH or HCHO into the plating vessel 1; drawing-up pump 9 for sampling the plating solution 3 in the plating vessel 1; analytical device 11 as an analytical means for analyzing the concentration of Cu, NaOH or HCHO in the plating solution 3 sampled using the drawing-up pump 9; input device 15 for setting command concentrations of replenishers Cu, NaOH and HCHO in the plating solution 3 and plating conditions such as surface area of material 13 to be plated; display device 17 for displaying the concentration of each component in the plating solution 3 described above; and control device 20, calculating the concentration of each component in plating solution 3 at the current point of time based on the plating conditions set by the input device 15 and the analyzed result given by the analytical device 11 to display on the display device 17, and also controlling the supply rate of each replenisher Cu, NaOH or HCHO from the supply pump 7 based on the calculated concentration of each component at the current point of time.

The control device 20 is constituted as a known microcomputer and is mainly composed of CPU, ROM and RAM. The control device 20 calculates the initial value of supply rate of each replenisher Cu, NaOH or HCHO at the beginning of plating, based on the plating conditions inputted through the input device 15, i.e. command concentration of the each component and surface area of the material 13 to be plated, and then not only outputs supply rate instruction corresponding to the calculated result to the supply pump 7 to start supplying the each replenisher, but also analyzes each of Cu concentration, NaOH concentration and HCHO concentration in the plating solution 3 using the analytical device 11 to store the result in RAM as an initial analyzed result.

Figure 4:
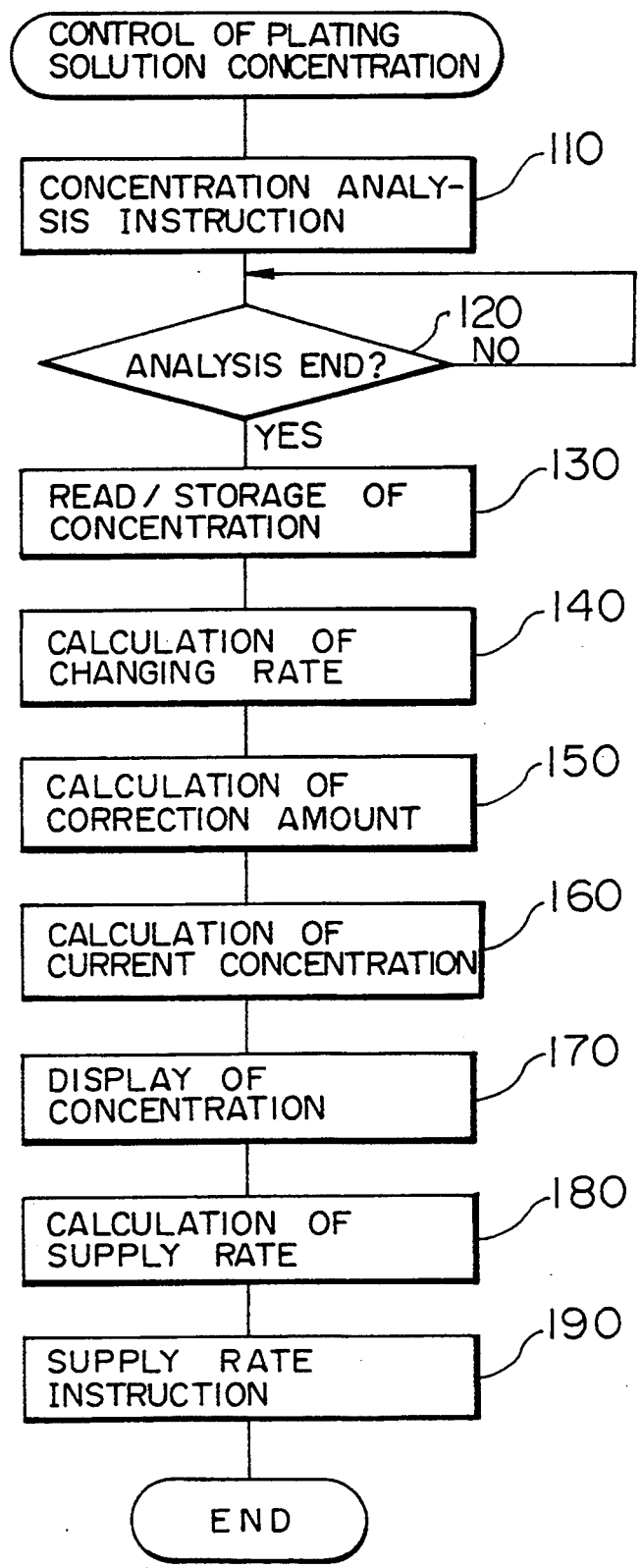
FIG. 4 is a flowchart showing the plating solution control processing executed in the control apparatus of Example 1.

After the procedure, the control device 20 controls the concentration of each component, Cu, NaOH or HCHO in the plating solution 3 to the command concentration by executing the concentration control processing of the plating solution according to the procedure shown in FIG. 4 for each predetermined time.

The concentration control processing of the plating solution is illustrated in detail through FIG. 4 as follows:

That is, as shown in FIG. 4, when the processing starts, at first, the concentration analysis instruction for each component Cu, NaOH or HCHO in the plating solution 3 is outputted to the analytical device 11 in Step 110.

Then, the analytical device 11 drives the drawing-up pump 9 to sample the plating solution 3 in the plating vessel 1, and subsequently analyzes the concentration of the each component in the sampled plating solution 3 according to a known analytical method.

The concentration analysis by the analytical device 11 requires 15 to 30 minutes. Accordingly, the examiner should wait until the concentration analysis of each component Cu, NaOH or HCHO by analytical device 11 is accomplished in following Step 120. When the concentration analysis is accomplished, the analyzed result, i.e. the concentration of each component Cu, NaOH or HCHO is read as the first concentration information and stored in RAM in Step 130.

In subsequent Step 140, a processing as a changing rate calculating means is executed in a manner in which the difference between the concentration of each component Cu, NaOH or HCHO as the second concentration information stored in RAM this time according to above Step 130 and the concentration of the each component analyzed last time using the analytical device 11 is determined, and subsequently the construction changing rate of the third concentration of the each component between the sampling of the plating solution of last time and the sampling of the plating solution of this time, based on the difference in concentrations determined above and the elapsed time from the outputting point of time of the analysis instruction to the analytical device 11 of last time to the outputting point of time of the analysis instruction to the analytical device 11 of this time.

Next, in Step 150, on the basis of the changing rate of the concentration of each component Cu, HaOH or HCHO calculated in Step 140 and the elapsed time from the outputting point of time of the analysis instruction to the analytical device 11 (i.e. from the sampling point of time of the plating solution for Concentration analysis by the analytical device 11) in Step 110 to the current point of time, the changing amount of concentration of the each component during the period is calculated, and subsequently the resulting value is set as a correction amount for the concentration of each component read this time in Step 130, to execute a processing as a changing amount calculating means.

In subsequent Step 160, a processing as a correcting means is executed, in which the current concentration of each component Cu, NaOH or HCHO is calculated by correcting the concentration of the each component read this time in Step 130 using the correction amount for the each component determined in Step 150. Then, in subsequent Step 170, the calculated current concentration is displayed on the display device 17 for each component, Cu, NaOH or HCHO.

In subsequent Step 180, the correction amount for the current supply rate of each replenisher Cu, NaOH or HCHO is determined based on the difference between the current concentration of each component Cu, NaOH or HCHO determined above and the command concentration of the each component set previously through the input device 15, and then a processing as a control amount calculating means for updating the supply amount is executed using the resulting correction amount. In subsequent Step 190, the supply rate instruction corresponding to the updated supply amount is outputted to the supply pump 7 to execute a processing as a supply control means for controlling the supply pump 7. Here, the processing is stopped for the present.

As described above, the automatic control apparatus of the present embodiment is designed so that: the concentration changing rate of each component Cu, NaOH or HCHO is determined based on the newest analyzed result and the analyzed result of last time and the elapsed time between the two analyzing points of time; the changing amount of the each component between the sampling point of time of the plating solution 3 for obtaining the newest analyzed result and the current point of time is determined based on the determined changing rate and the elapsed time between the two analyzing points of time; the current concentration of the each component is detected by correcting the newest analyzed result based on the determined changing amount; and the supply rate of each replenisher Cu, NaOH or HCHO is controlled based on the detected current concentration.

Figure 5A:
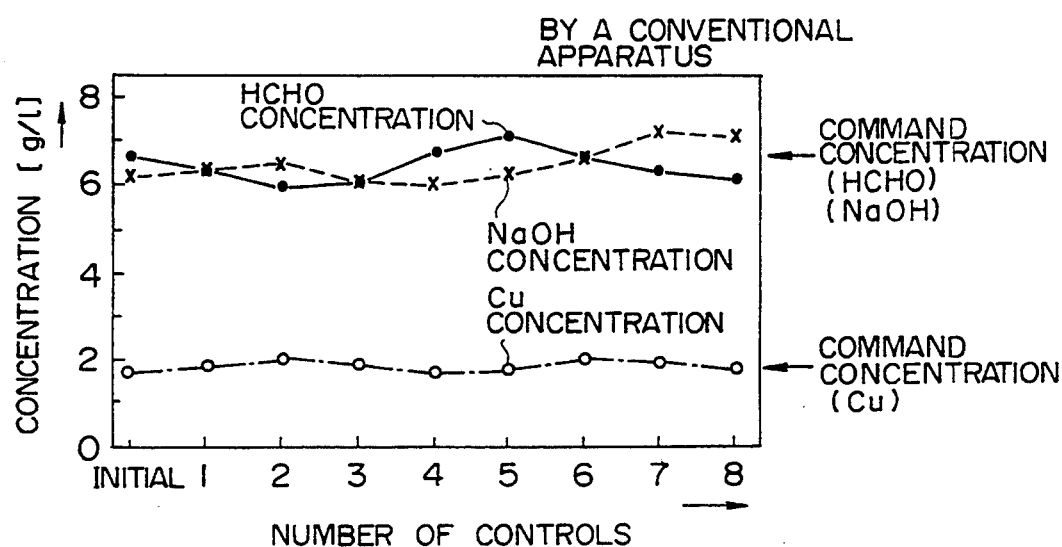
FIGS. 5A and 5B are graphical representations showing the comparison between the control result of concentration of a plating solution by a conventional apparatus and the control result of concentration of a plating solution by an apparatus of an embodiment.
Figure 5B:
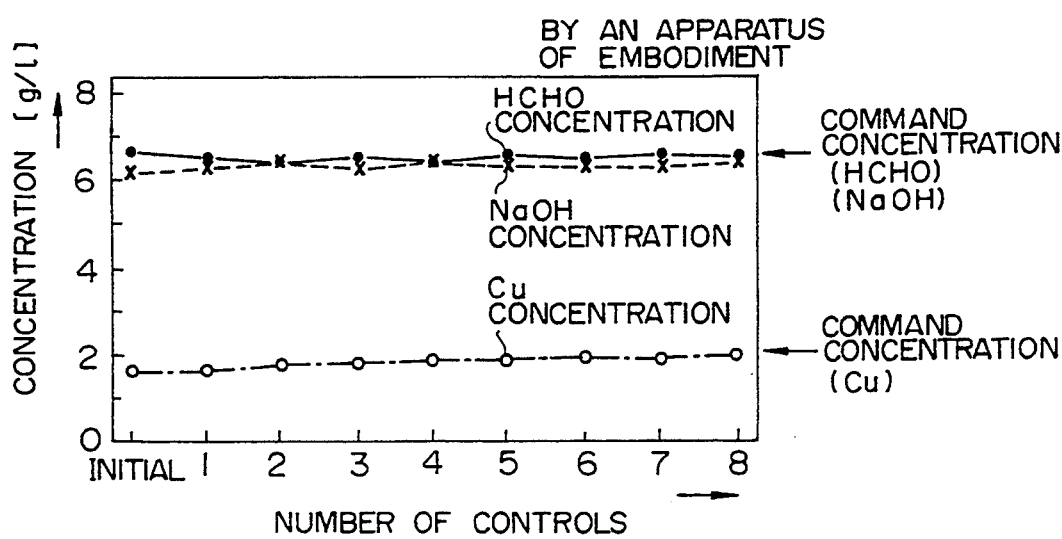

Accordingly, according to the present embodiment, as shown in FIGS. 5A and 5B, compared to the conventional apparatus which controls the supply rate of replenishers Cu, NaOH and HCHO employing the concentration of each component Cu, NaOH or HCHO in the plating solution 3 analyzed by the analytical device 11 as it is, not only fluctuation in concentration of the each component in the plating solution 3 can be lowered more effectively, but also more uniform plating of the material 13 to be plated becomes possible.

Figure 6:
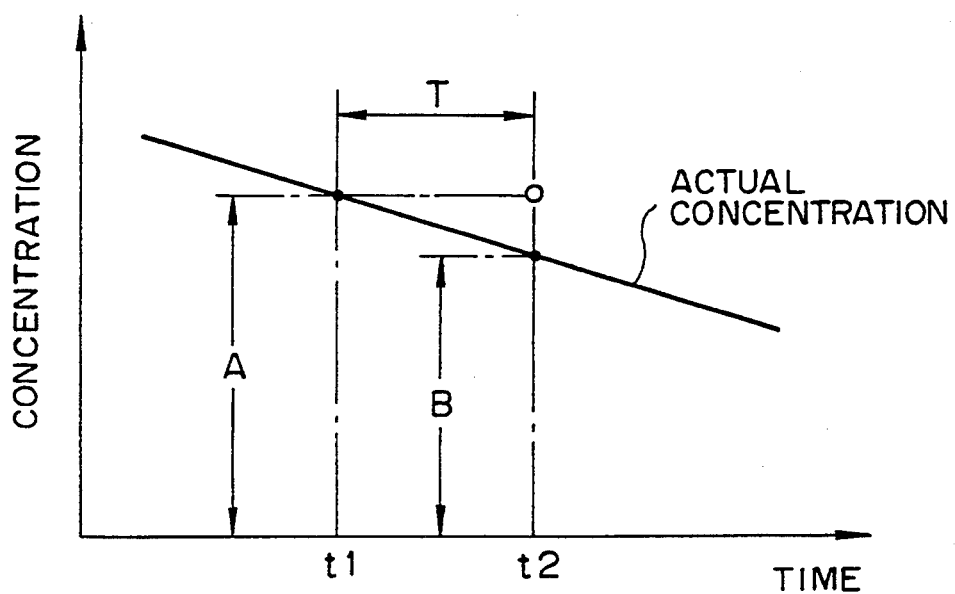
FIG. 6 is a graphical representation illustrating the comparison of control behaviors of concentrations of a plating solution between a conventional apparatus and an apparatus of an embodiment.

That is, as shown in FIG. 6, in the conventional apparatus in which a plating solution is sampled at t1 and the supply rate of replenisher is calculated based on the concentration A of the plating solution obtained at t2 when the analyzing time T has elapsed from t1, to supply the replenisher. Therefore, the replenisher can not be supplied corresponding to the concentration B at t2, which results in lowering of the control precision. On the other hand, in the present invention in which the concentration changing amount of the plating solution during the period from t1 to t2 is calculated to correct the plating solution concentration A. Therefore, the supply rate at t2 becomes a value corresponding to the plating solution concentration B at that time, which results in a possibility to improve the control precision of the plating solution concentration.

FIG. 5A shows a experimental result of change in concentration of each component Cu, NaOH or HCHO in case where the plating solution concentration is controlled using a conventional apparatus. FIG. 5B shows an experimental result of change in concentration of the each component in case where the plating solution concentration is controlled using an apparatus of the present embodiment.

Although the embodiment described above is illustrated concerning a plating apparatus for electroless copper plating, the present invention is applicable to other plating apparatuses using different plating solution components to control the component concentration of the plating solution.

The present invention is also applicable to detect and control of concentration of various kinds of chemical treating solutions which have been used for various kinds of chemical treatments, such as conversion treating solutions used for various kinds of conversion treatments, etching solutions used for pattern formation of print circuit boards, etc., release solutions used for release of various kinds of dry films, e.g. resists formed on substrates in etching, and the like.

In addition, although the embodiment described above is illustrated concerning an apparatus supplying replenisher constantly in which the supply rate is controlled, the present invention is also applicable to other apparatuses supplying replenisher periodically in which the supply amount in replenishment is controlled, to give the same effects described in the above embodiment.

(Example 2)

Another embodiment of the present invention is illustrated in conjunction with the accompanying drawings as follows.

The automatic control apparatus for a plating solution used in Example 2 is the same as the apparatus used in Example 1.

Figure 7:
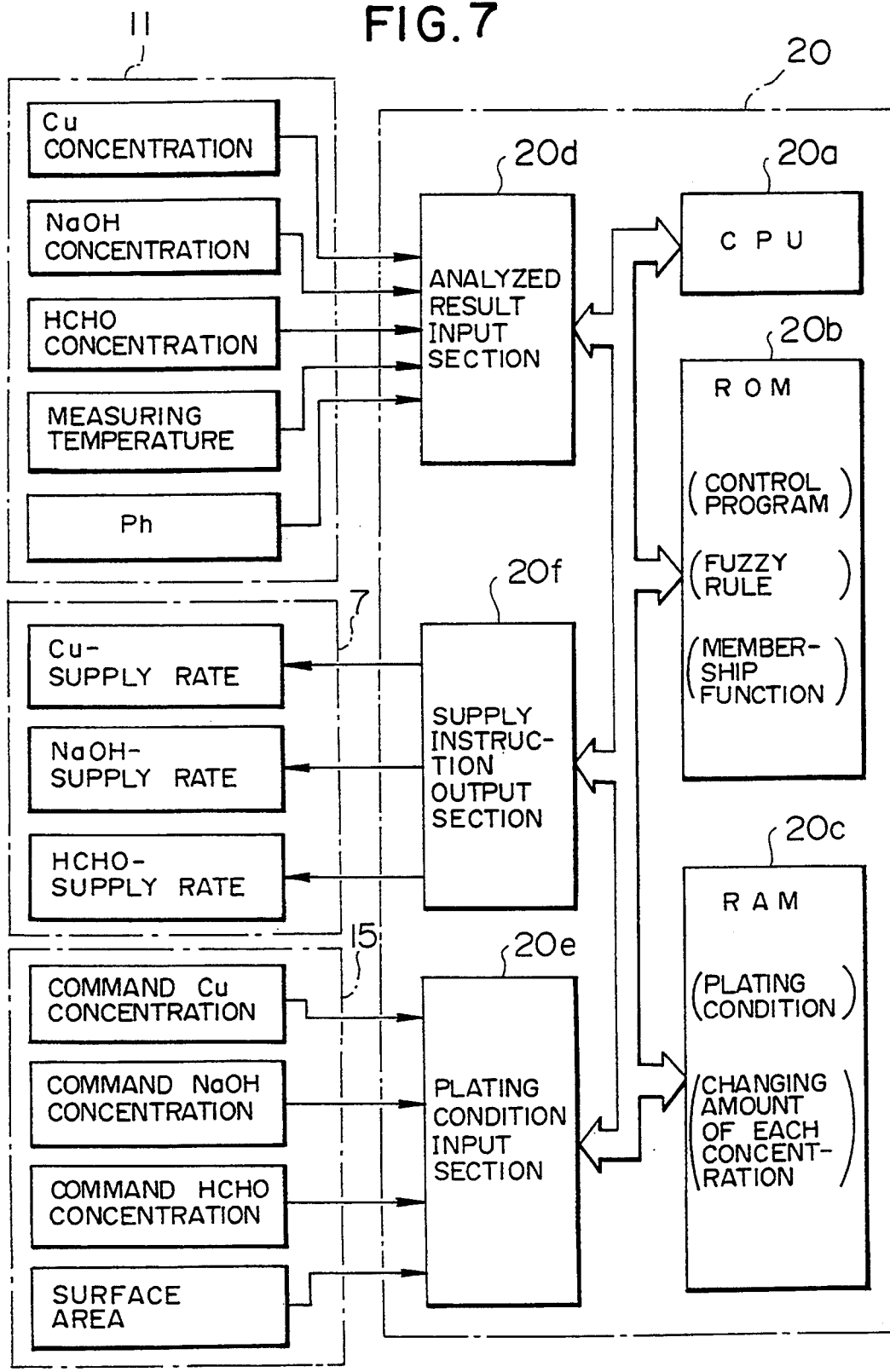
FIG. 7 is a block diagram illustrating the internal constitution of a control device 20 and the flow of each signal to be inputted/outputted to the control apparatus of Example 2.

However, in Example 2, the control method in the control apparatus shown in FIG. 3 was modified as follows:

The control apparatus 20 of Example 2, as shown in FIG. 7, is constituted as a known microcomputer mainly composed of CPU 20a, ROM 20b, RAM 20c, and was equipped with an analyzed result input section 20d which inputs signals representing Cu concentration, NaOH concentration, HCHO concentration, measuring temperature and Ph which all are outputted from the analytical device 11, a plating condition input section 20e which inputs signals representing command concentration of each replenisher Cu, NaOH or HCHO set by the input device 11 and surface area of the material 13 to be plated, and a supply instruction output section 20f which outputs control signals for control of supply rate of the each replenisher to the supply pump 7, as input/output interface.

Within ROM 20b, there are stored control programs to execute above the supply rate control, and also data such as fuzzy rules and membership functions described below required for execution of the control program.

The control device 20, when the various plating conditions described above are inputted through the input device 15, stores the plating conditions in RAM 20c; thereafter calculates the changing amount of the replenisher concentration and stores the resultants in RAM 20c each time the concentration of each replenisher Cu, NaOH or HCHO is given from the analytical device 11; calculates the supply rate of each replenisher Cu, NaOH or HCHO based on these plating conditions, the concentration of the each replenisher, the changing amount of the each replenisher concentration and fuzzy rule and membership function in the ROM 20b; delivers the control signals depending on the calculated results to the supply pump 7; and supplies the each replenisher at the calculated supply rate from the supply pump 7 into the plating vessel 1.

The supply rate control processing executed in the CPU 20a is illustrated through a flowchart shown in FIG. 8 below. The supply rate control processing is explained on the assumption that the command concentration of each replenisher Cu, NaOH or HCHO and the plating conditions such as surface area of the material 13 to be plated are inputted from the input device 15 and the plating conditions have been stored in the RAM 20a previously.

Figure 8:
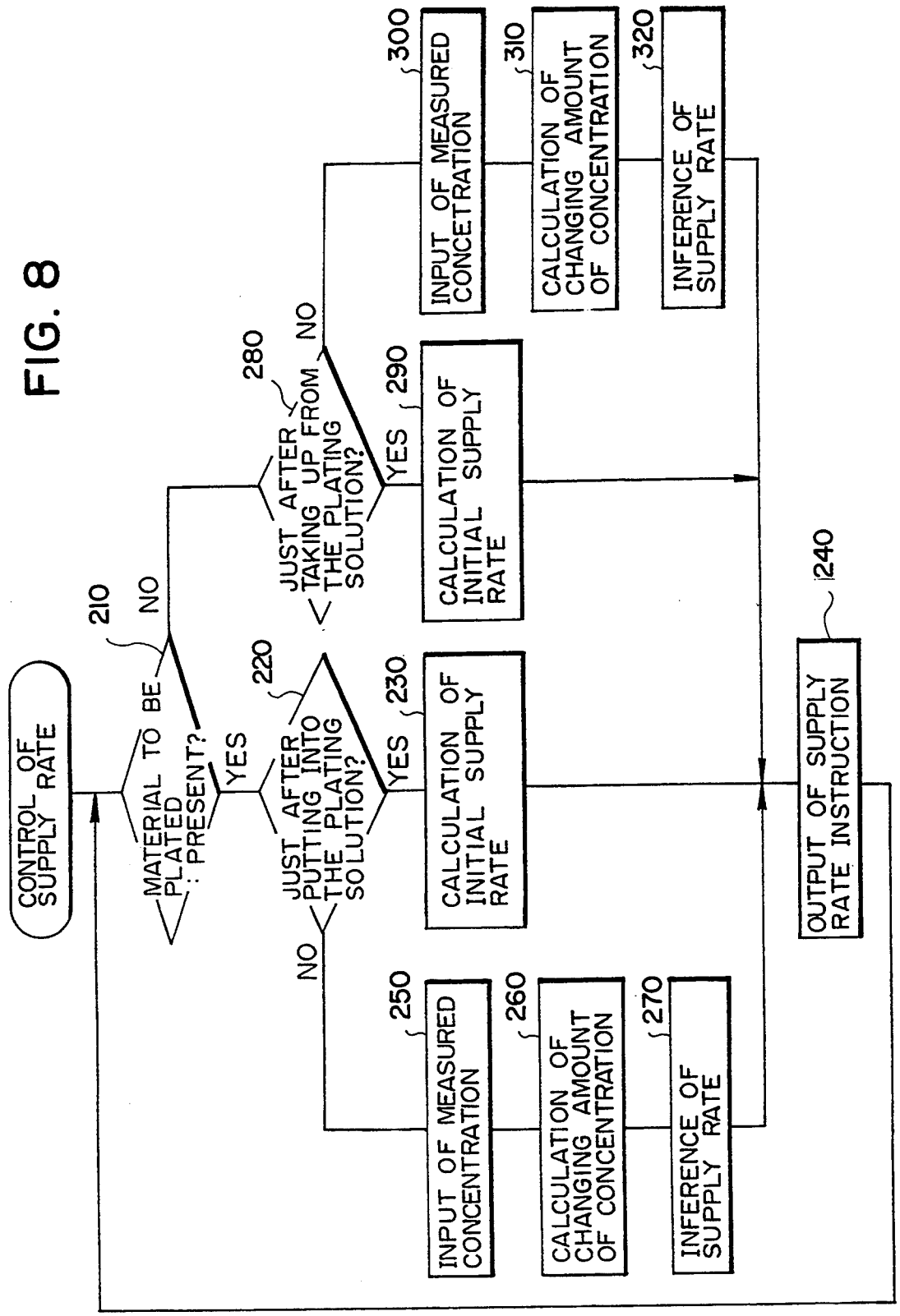

As shown in FIG. 8, when the processing starts, at first it is judged in Step 210 whether the material 13 to be plated is put into the plating vessel 1 or not. Then, when it is judged to be just after putting the material 13 into, it is further judged in the subsequent Step 220 whether at present the material 13 is just after put into or not. In this step, when it is judged to be just after putting the material 13 into, the procedure is shifted to Step 230, and the initial value of supply rate of each replenisher Cu, NaOH or HCHO in plating is calculated based on the command concentration of the each replenisher and the surface area of the material 13 (plating load). In subsequent Step 240, the supply rate instruction corresponding to the calculated result is outputted to the supply pump 7, and then the procedure is returned to Step 210 again.

On the other hand, when it is judged not to be just after putting the material 13 to be plated into at the present in Step 220, that is, the material 13 is in plating, the procedure is shifted to Step 250, and then the concentration of each replenisher Cu, NaOH or HCHO analyzed in the analytical device 11 is read. In subsequent Step 260, the changing amount per unit time of the each replenisher is calculated based on the second concentration of the each replenisher, i.e. the second concentration information of the predetermined component read this time of the second analysis and the first concentration of the each replenisher, i.e. the first concentration information of the predetermined component read last time of the first analysis.

Shifting to subsequent Step 270, the correction amount of the supply rate of each replenisher Cu, NaOH or HCHO is inferred by fuzzy inference from the calculated concentration changing amount of the each replenisher, the concentration of the each replenisher read this time and the command concentration of the each replenisher, to update the correction rate of the each replenisher. Then, shifting to Step 240, the supply rate instruction corresponding to the updated supply rate is outputted to the supply pump 7 so that the outputted date becomes the third concentration, and subsequently the procedure is returned to Step 210 again.

Next, in Step 210.described above, when it is judged to be in preparation of plating bath where the material 13 to be plated is not put into the plating vessel 1 yet, the procedure is shifted to Step 280, where it is judged whether it is just after taking up the material 13 or not. When it is judged to be just after taking up the material 13 at present, the procedure is shifted to Step 290, where the initial value of the supply rate of each replenisher Cu, NaOH or HCHO at the preparing point of time of the plating bath is calculated based on the command concentration of the each replenisher and the surface area of the material 13 both stored in the replenisher RAM 20a, in order to decrease the supply rate of the each replenisher. After shifting to subsequent Step 240 where the supply rate instruction corresponding to the calculated result is outputted to the supply pump 7, the procedure is returned to Step 210 again.

On the other hand, in Step 280, when it is judged to be not just after taking up the material 13 to be plated from the plating vessel 1, the procedure is shifted to Step 300 where the concentration of each replenisher Cu, NaOH or HCHO analyzed in the analytical device 11 is read. In subsequent Step 310, the changing amount per unit time of the concentration of the each replenisher in the same manner as in the Step 250 described above. In subsequent Step 320, the correction amount of the supply rate of the each replenisher is inferred by fuzzy inference as the same manner as in the Step 270 described above, to update the supply rate of the each replenisher. Shifting to subsequent Step 240, the supply rate instruction corresponding to the updated supply rate is outputted to the supply pump 7, and the procedure is returned to Step 210 again.

As described above, the present embodiment is constituted so that the correction amounts of the supply rate of each replenisher Cu, NaOH or HCHO are inferred by fuzzy inference both in the plating where the material 13 to be plated is put into the plating vessel 1 and in the preparation of plating bath where the material 13 is taken up from the plating vessel 1, to update the supply rate of the each replenisher.

Next, the procedure of the fuzzy inference executed in Steps 270 and 320, the membership functions used in execution of the fuzzy inference and the fuzzy rules which are plural rules set based on each concentration information are illustrated more in detail as follows.

First, FIGS. 9A to 9D, 10A to 10D and 11A to 11D show the membership functions used in the fuzzy inference concerning the replenishers Cu, NaOH and HCHO, respectively. The cross or horizontal axis corresponds to each value shown in the figures, and the vertical axis corresponds to the "degree of certainty", that is certainty factor depending on the value, in each membership function shown in the figures.

The FIG. 9A is a characteristic diagram showing the membership functions concerning the concentration of a replenisher Cu. The fuzzy sets of the Cu concentration are partitioned into the fuzzy sets of seven scales against the Cu command concentration, i.e. "considerably smaller (NL)", "smaller (NM)", "smaller in some degree (NS)", "same as the command concentration (ZR)", "larger in small degree (PS)", "larger (PM)" and "considerably larger (PL)". Each membership function forms a membership function concerning the Cu concentration.

The FIG. 9B is a characteristic diagram showing the membership functions concerning the changing amount of the concentration of the replenisher Cu. The fuzzy sets of the Cu concentration changing amount are partitioned into the fuzzy sets of five scales, i.e., "considerably smaller (NL)", "smaller in some degree (NS)", "no change (ZR)", "larger in small degree (PS)", and "considerably larger (PL)". Each membership function forms a membership function concerning the Cu concentration changing amount.

The FIG. 9C is a characteristic diagram showing the membership functions concerning the current supply rate of the replenisher Cu. The fuzzy sets of the current Cu supply rate are partitioned into the fuzzy sets of two scales, i.e., "smaller (N)" and "larger (P)". Each membership function forms a membership function concerning the current Cu supply rate.

The FIG. 9D is a characteristic diagram showing the membership functions concerning the supply rate of the replenisher Cu. The fuzzy sets of the Cu supply rate are partitioned into the sets of seven scales against the current Cu supply rate, i.e., "considerably decreasing (NL)", "decreasing (NM)", "decreasing in some degree (NS)", "maintaining the current rate (ZR)", "increasing in small degree (PS)", "increasing (PM)" and "considerably increasing (PL)" the supply rate. Each membership function forms a membership function concerning the Cu supply rate.

The FIG. 10A is a characteristic diagram showing the membership functions concerning the concentration of a replenisher NaOH. The fuzzy sets of the NaOH concentration, similarly to the fuzzy sets of the Cu concentration described above, are partitioned into the fuzzy sets of seven scales to the NaOH command concentration, i.e., "considerably smaller (NL)", "smaller (NM)", "smaller in some degree (NS)", "same as the command concentration (ZR)", "larger in small degree (PS)", "larger (PM)" and "considerably larger (PL)".

The FIG. 10B is a characteristic diagram showing the membership functions concerning the changing amount of the concentration of the replenisher NaOH. The fuzzy sets of the NaOH concentration changing amount, similarly to the fuzzy sets of the Cu concentration changing amount, are partitioned into the fuzzy sets of five scales, i.e., "considerably smaller (NL)", "smaller in some degree (NS) ", "no change (ZR)", "larger in small degree (PS)", and "considerably larger (PL)".

The FIG. 10C is a characteristic diagram showing the membership functions concerning the current supply rate of the replenisher NaOH. The fuzzy sets of the current NaOH supply rate, similarly to the fuzzy sets of the current Cu supply rate, are partitioned into the fuzzy sets of two scales, i.e., "smaller (N)" and "larger (P)". The FIG. 10D is a characteristic diagram showing the membership functions concerning the supply rate of the replenisher NaOH. The fuzzy sets of the NaOH supply rate, similarly to the fuzzy sets of the Cu supply rate, are partitioned into the sets of seven scales to the current NaOH supply rate, i.e., "considerably decreasing (NL)", "decreasing (NM)", "decreasing in some degree (NS)", "maintaining the current rate (ZR)", "increasing in small degree (PS)", "increasing (PM)" and "considerably increasing (PL)" the supply rate.

The FIG. 11A is a characteristic diagram showing the membership functions concerning the concentration of a replenisher HCHO. The fuzzy sets of the HCHO concentration, similarly to the fuzzy sets of the Cu and NaOH concentrations described above, are partitioned into the fuzzy sets of seven scales to the HCHO command concentration, i.e. "considerably smaller (NL)", "smaller (NM)", "smaller in some degree (NS)", "same as the command concentration (ZR)", "larger in small degree (PS)", "larger (PM)" and "considerably larger (PL)".

The FIG. 11B is a characteristic diagram showing the membership functions concerning the changing amount of the concentration of the replenisher HCHO. The fuzzy sets of the HCHO concentration changing amount, similarly to the fuzzy sets of the Cu and HaOH concentration changing amounts, are partitioned into the fuzzy sets of five scales, i.e., "considerably smaller (NL)", "smaller in some degree (NS)", "no change (ZR)", "larger in small degree (PS)", and "considerably larger (PL)".

The FIG. 11C is a characteristic diagram showing the membership functions concerning the current supply rate of the replenisher HCHO. The fuzzy sets of the current HCHO supply rate, similarly to the fuzzy sets of the current Cu and NaOH supply rates, are partitioned into the fuzzy sets of two scales, i.e., "smaller (N)" and "larger (P)".

The FIG. 11D is a characteristic diagram showing the membership functions concerning the supply rate of the replenisher HCHO. The fuzzy sets of the HCHO supply rate, similarly to the fuzzy sets of the Cu and NaOH supply rates, are partitioned into the sets of seven scales against the current NaOH supply rate, i.e., "considerably decreasing (NL) ", "decreasing (NM)", "decreasing in some degree (NS) ", "maintaining the current rate (ZR)", "increasing in small degree (PS)", "increasing (PM)" and "considerably increasing (PL)" the supply rate.

The fuzzy rules in plating employed in above Step 270 are set based on the membership functions concerning the concentration, the concentration changing amount, the current supply rate and the supply rate of each replenisher Cu, NaOH or HCHO, as shown in Tables 1 to 3. The fuzzy rules at preparation of plating bath employed in above Step 220 are set based on each membership function described above, as shown in Tables 4 to 6.

TABLE 1

| | → Cu Concentration | | | | | | |
|---|---|---|---|---|---|---|---|
| | NL | NM | NS | ZR | PS | PM | PL |
| ← Cu Concentration | | | | | | | |
| PL | ZR | NS | NM | NM | NS | NM | NL |
| PS | PM | ZR | ZR | NS | NS | NM | NL |
| ZR | PL | PS | ZR | ZR | NS | NM | NL |
| NS | PL | PM | PS | PS | NS | NM | NL |
| NL | PL | PM | PM | PM/PS | NS | NM | NL |

TABLE 2

| | → NAOH Concentration | | | | | | |
|---|---|---|---|---|---|---|---|
| | NL | NM | NS | ZR | PS | PM | PL |
| ← NaOH Concentration changing amount | | | | | | | |
| PL | ZR | NS | NM | NM | NS | NM | NL |
| PS | PM | ZR | ZR | NS | NS | NM | NL |
| ZR | PL | PS | ZR | ZR | NS | NM | NL |
| NS | PL | PM | PS | NS/PS | NS | NM | NL |

TABLE 2-continued

| | → NAOH Concentration | | | | | | |
|---|---|---|---|---|---|---|---|
| | NL | NM | NS | ZR | PS | PM | PL |
| NL | NL | PM | PM | PM/PS | NS | NM | NL |

TABLE 3

| | HCHO Concentration | | | | | | |
|---|---|---|---|---|---|---|---|
| | NL | NM | NS | ZR | PS | PM | PL |
| ← HCHO Concentration changing amount | | | | | | | |
| PL | ZR | NS | NM | NM | NS | NM | NL |
| PS | PM | ZR | ZR | NS | NS | NM | NL |
| ZR | PL | PS | ZR | ZR | NS | NM | NL |
| NS | PL | PM | PS | PS | NS | NM | NL |
| NL | PL | PM | PM | PM/PS | NS | NM | NL |

TABLE 4

| | → Cu Concentration | | | | | | |
|---|---|---|---|---|---|---|---|
| | NL | NM | NS | ZR | PS | PM | PL |
| ← Cu Concentration changing amount | | | | | | | |
| PL | ZR | NS | NL | stop | stop | stop | stop |
| PS | PM | ZR | NS | stop | stop | stop | stop |
| ZR | PL | PS | ZR | ZR | stop | stop | stop |
| NS | PL | PM | PS | PS | stop | stop | stop |
| NL | accident | accident | ZR | accident | stop | stop | stop |

TABLE 5

| | → NaOH Concentration | | | | | | |
|---|---|---|---|---|---|---|---|
| | NL | NM | NS | ZR | PS | PM | PL |
| ← NaOH Concentration changing amount | | | | | | | |
| PL | ZR | NS | NL | stop | stop | stop | stop |
| PS | PM | ZR | NS | stop | stop | stop | stop |
| ZR | PL | PS | ZR | ZR | stop | stop | stop |
| NS | PL | PM | PS | NS/PS | stop | stop | stop |
| NL | accident | accident | ZR | accident | stop | stop | stop |

TABLE 6

| | → HCHO Concentration | | | | | | |
|---|---|---|---|---|---|---|---|
| | NL | NM | NS | ZR | PS | PM | PL |
| ← HCHO Concentration changing amount | | | | | | | |
| PL | ZR | NS | NL | stop | stop | stop | stop |
| PS | PM | ZR | NS | stop | stop | stop | stop |
| ZR | PL | PS | ZR | ZR | stop | stop | stop |
| NS | PL | PM | PS | PS | stop | stop | stop |
| NL | accident | accident | ZR | accident | stop | stop | stop |

Tables 1 to 3 and Tables 4 to 6 are tables showing the fuzzy rules concerning the replenisher supply rates whose condition formulae are formed based on the replenisher concentration and the replenisher concentration changing amount, which are set for each replenisher Cu, NaOH or HCHO both in both plating and in preparation of plating bath. The fuzzy rules are set so that the membership functions concerning the current supply rate of the each replenisher are employed under the given combination conditions of the replenisher concentration with the replenisher changing amount, as described below, That is, Table 1, for example, is a summary of the following fuzzy rules:

(1) If the Cu concentration is considerably smaller than the command concentration (NL), and
  the Cu concentration changing amount increases considerably (PL),
  the Cu supply rate is maintained at the current rate (ZR).
(2) If the Cu concentration is considerably smaller than the command concentration (NL), and
  the Cu concentration changing amount increases to some degree (PL),
  the Cu supply rate is increased (PM).
(3) If the Cu concentration is considerably smaller than the command concentration (NL), and
  the Cu concentration changing amount is zero (ZR),
  the Cu supply rate is considerably increased (PL).
(4) If the Cu concentration is considerably smaller than the command concentration (NL), and
  the Cu concentration changing amount decreases to some degree (NS),
  the Cu supply rate is considerably increased (PL).
(5) If the Cu concentration is considerably smaller than the command concentration (NL), and
  the Cu concentration changing amount decreases considerably (NL),
  the Cu supply rate is considerably increased (PL).
(6) If the Cu concentration is smaller than the command concentration (NM), and
  the Cu concentration changing amount increases considerably (PL),
  the Cu supply rate is decreased to some degree (NS).
(7) If the Cu concentration is smaller than the command concentration (NM), and
  the Cu concentration changing amount increases to some degree (PL),
  the Cu supply rate is maintained at the current rate (ZR).
(8) If the Cu concentration is smaller than the command concentration (NM), and
  the Cu concentration changing amount is zero (ZR),
  the Cu supply rate is increased to some degree (PS).
(9) If the Cu concentration is smaller than the command concentration (NM), and
  the Cu concentration changing amount decreases to some degree (NS),
  the Cu supply rate is increased (PM).
(10) If the Cu concentration is smaller than the command concentration (NM), and
  the Cu concentration changing amount decreases considerably (NL),
  the Cu supply rate is increased (PM).
(11) If the Cu concentration is smaller than the command concentration to some degree (PM), and
  the Cu concentration changing amount increases considerably (PL),
  the Cu supply rate is decreased (NM).
(12) If the Cu concentration is smaller than the command concentration to some degree (NS), and
  the Cu concentration changing amount increases to some degree (PL),
  the Cu supply rate is maintained at the current rate (ZR).

(13) If the Cu concentration is considerably smaller than the command concentration to some degree (NS), and
  the Cu concentration changing amount is zero (ZR),
  the Cu supply rate is maintained at the current rate (ZR).
(14) If the Cu concentration is smaller than the command concentration to some degree (NS), and
  the Cu concentration changing amount decreases to some degree (NS),
  the Cu supply rate is considerably increased to some degree (PS).
(15) If the Cu concentration is smaller than the command concentration to some degree (NS), and
  the Cu concentration changing amount decreases considerably (NL),
  the Cu supply rate is increased (PM).
(16) If the Cu concentration is same as the command concentration (ZR), and
  the Cu concentration changing amount increases considerably (PL),
  the Cu supply rate is decreased (NM).
(17) If the Cu concentration is same as the command concentration (ZR), and
  the Cu concentration changing amount increases to some degree (PL),
  the Cu supply rate is decreased to some degree (NS).
(18) If the Cu concentration is same as the command concentration (ZR), and
  the Cu concentration changing amount is zero (ZR),
  the Cu supply rate is maintained at the current rate (ZR).
(19) If the Cu concentration is same as the command concentration (ZR), and
  the Cu concentration changing amount decreases to some degree (NS),
  the Cu supply rate is increased to some degree (PS).
(20) If the Cu concentration is same as the command concentration (ZR), and
  the Cu concentration changing amount decreases considerably (NL),
  the Cu supply rate is increased (PM).
(21) If the Cu concentration is same as the command concentration (ZR),
  the Cu concentration changing amount increases considerably (NL),
  the current NaOH supply rate is small (N), and
  the current HCHO supply rate is small (N),
  the Cu supply rate is increased (PS).
(22) If the Cu concentration is larger than the command concentration to some degree (NS),
  the Cu supply rate is decreased to some degree (NS).
(23) If the Cu concentration is larger than the command concentration (PM),
  the Cu supply rate is decreased (NM).
(24) If the Cu concentration is larger than the command concentration considerably (PL),
  the Cu supply rate is considerably decreased (NL).

The fuzzy rules are set so that the membership functions of the current NaOH supply rate and the HCHO current supply rate are further employed in the case where the Cu concentration is same as the command concentration (ZR) and the Cu concentration changing amount decreases considerably (NL), as described in the rules (20) and (21).

This is because the concentrations of each replenisher Cu, NaOH and HCHO influences one another. For example, when the Cu replenisher is supplied, alkalinity of the plating solution becomes stronger since the Cu replenisher exhibits alkaline, and therefore the supply amount of NaOH should be decreased. Accordingly, the rules described above are set so that the supply rate of each replenisher Cu, NaOH or HCHO can be optimally controlled synthetically.

The fuzzy rules shown in Tables 2 to 6 are basically set as same as those described above. The fuzzy rules written as "NS/PS" and "PM/PS" in Table 2 and the fuzzy rule written as "PM/PS" in Table 3 are set respectively as follows:

."NS/PS" in Table 2
  (a) If the NaOH concentration is same as the command concentration (ZR),
    the NaOH concentration changing amount decreases to some degree (NS), and
    the current Cu supply rate is small (N),
    the NaOH supply rate is decreased to some degree (NS).
  (b) If the NaOH concentration is same as the command concentration (ZR),
    the NaOH concentration changing amount decreases to some degree (NS), and
    the current Cu supply rate is large (P),
    the NaOH supply rate is increased to some degree (PS).

."PM/PS" in Table 2
  (c) If the NaOH concentration is same as the command concentration (ZR), and
    the NaOH concentration changing amount decreases considerably (NL),
    the NaOH supply rate is increased (PM).
  (d) If the NaOH concentration is same as the command concentration (ZR),
    the NaOH concentration changing amount decreases considerably (NL),
    the current Cu supply rate is small (N), and
    the current HCHO supply rate is small (N),
    the NaOH supply rate is increased to some degree (PS).

."PM/PS" in Table 3
  (e) If the HCHO concentration is same as the command concentration (ZR), and
    the HCHO concentration changing amount decreases considerably (NL),
    the NaOH supply rate is increased (PM).
  (f) If the HCHO concentration is same as the command concentration (ZR),
    the HCHO concentration changing amount decreases considerably (NL),
    the current Cu supply rate is small (N), and
    the current NaOH supply rate is small (N),
    the HCHO supply rate is increased to some degree (PS).

In Tables 4 to 6, the fuzzy rule written as "accident" means that the supply rate of each replenisher Cu, NaOH or HCHO is maintained at the current rate under each condition, in which the indication "there is a possibility or possibilities of pump accident and/or plating accident" is displayed on a display device not shown in the figure. The fuzzy rule written as "stop" means that the supply of the each replenisher is stopped under each condition.

Figure 12:
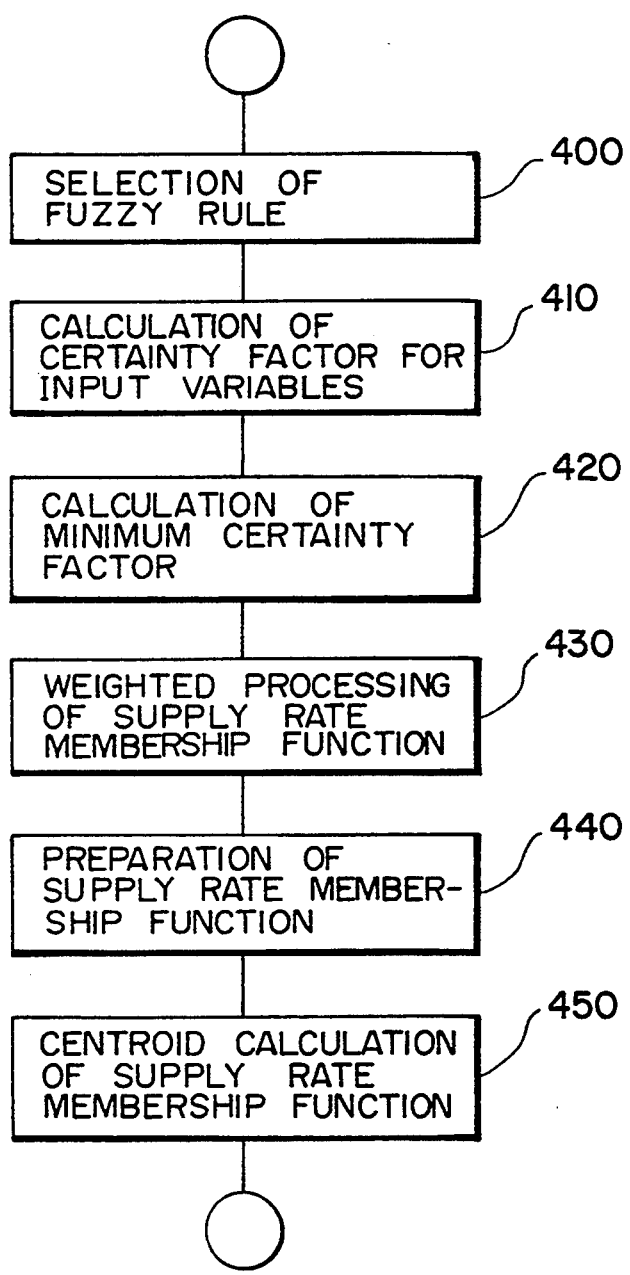
FIG. 12 is a flowchart showing the processing procedure in fuzzy inference of the correction value in supply rate of each replenisher in Steps 270 and 320 in FIG. 8.

Next, the procedure of the fuzzy inference executed in Steps 270 and 320 described above by employing the fuzzy rules shown in Tables 1 to 6 described above and the membership functions shown in FIGS. 9A to 11D is illustrated through the flowchart shown in FIG. 12.

The fuzzy inference shown in FIG. 12 is executed for each replenisher Cu, NaOH or HCHO.

As shown in FIG. 12, in Step 400, at first, the fuzzy rule to be employed for the fuzzy inference is selected depending on whether it is in plating or in preparing of plating bath at present. That is, it is selected which rules should be employed, rules for plating shown in Tables 1 3 or rules for in preparation of bath shown in Tables 4 to 6.

Next, in Step 410, the deviation between the actual concentration of each replenisher Cu, NaOH or HCHO analyzed by the analytical device 11 and the command concentration of each replenisher, and subsequently, the certainty factor thereof against each input variable is determined by each membership functions described above based on the concentration deviation and the changing amount of the replenisher concentration determined in Step 260 or 310.

In subsequent Step 420, it is examined and selected to what kind of fuzzy rule among those described above is accommodated the fuzzy sets to which each variable described above belongs, and then the certainty factors of the concentration deviations of replenishers Cu, NaOH and HCHO and the certainty factors of the concentration changing amount of the replenishers are compared to each other for each accommodated fuzzy rule, to give minimum certainty factor. In this case, if it is required to examine the current supply rate of each replenisher Cu, NaOH or HCHO in the fuzzy rule selected based on the concentration deviation of each replenisher Cu, NaOH or HCHO and the concentration changing amount of the replenisher, the certainty factors concerning these fuzzy sets should be determined and set their minimum certainty factor.

In subsequent Step 430, the weighted processing based on the minimum certainty factor against the membership functions concerning the supply rate of each replenisher Cu, NaOH or HCHO. Then, in subsequent Step 440, the membership functions concerning the each replenisher which is weighted-processed for each fuzzy rule, to prepare a new membership function by union concerning the supply rate of each replenisher.

Then, the centroid value G of the membership function thus prepared is calculated and established as a correction amount for the supply rate of each replenisher Cu, NaOH or HCHO.

Figure 13:
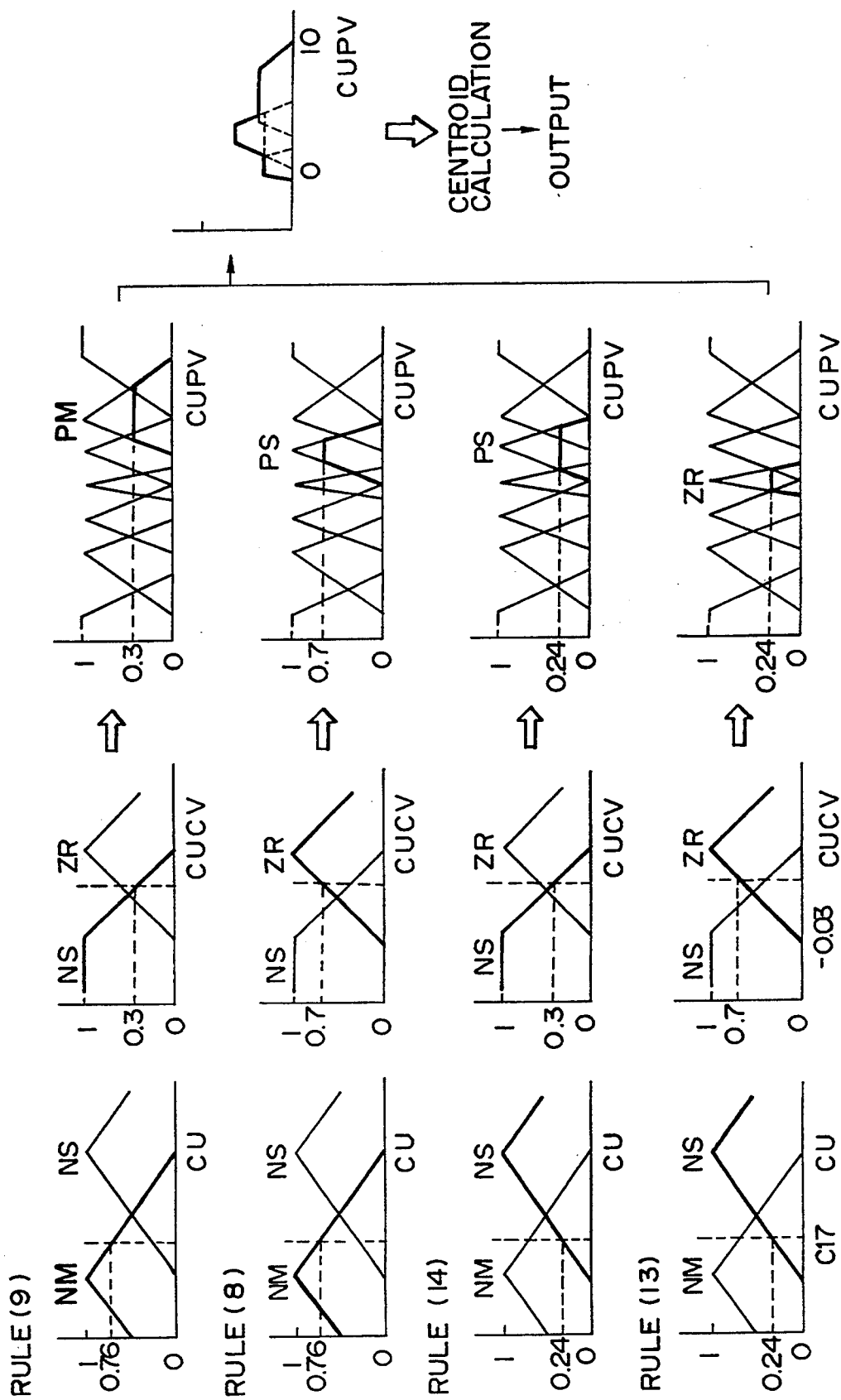
FIG. 13 is a graphical representation illustrating an embodiment of the fuzzy inference procedure shown in FIG. 12.

The embodiment of fuzzy inference described above is illustrated along the FIG. 13. In FIG. 13, the command value (command concentration) of Cu concentration is set to 1.9 [ g/l], and there is shown an inference example of the Cu supply rate correction amount (CUPV) in plating in the case where the Cu concentration (CU) analyzed by the analytical device 11 is 1.73[ g/l] and the Cu concentration changing amount (CUCV) is −0.03[ g/l.min].

As shown in FIG. 13, the Cu concentration (CU) is applied to two sets., i.e. "smaller (NM)" and "smaller to some degree (NS)", and the Cu concentration changing amount (CUCV) is applied to two sets, i.e., "decreasing to some degree (NS)" and "zero (ZR)". Accordingly, as fuzzy rules containing these sets, rules (8), (9), (13) and (14) are selected among the rules described above.

The certainty factor of a fuzzy set NM of the Cu concentration is determined to be 0.76 since the deviation between the Cu concentration and the command Cu concentration is 0.17[ g/l], and similarly the certainty factor of a fuzzy set NS of the Cu concentration is determined to be 0.24. On the other hand, the certainty factor of a fuzzy set NS of the Cu concentration changing amount is determined to be 0.7 since the Cu concentration changing amount is −0.03[ g/l], and similarly the certainty factor of a fuzzy set ZR of the Cu concentration changing amount is determined to be 0.3.

Accordingly, the minimum certainty factor of the rules (8), (9), (13) and (14) described above are determined to be 0.7, 0.9, 0.24 and 0.24, respectively, by which the weight-processed membership function concerning the Cu supply rate for each rule of (8), (9), (13) and (14) can be determined.

By adding all of the membership functions given by above procedure to one another, a new membership function can be prepared. The membership function is calculated of its centroid value G to determine the correction value CUPV of the Cu supply rate.

As described above, the present embodiment is constituted so that the correction amount of supply rate of each replenisher Cu, NaOH or HCHO is determined according to fuzzy inference in which the difference between the concentration of each component in a plating solution and the command concentration, the concentration changing amount per unit time of the each component and the current supply rate of the each replenisher Cu, NaOH or HCHO are inputted, to correct the supply rate of the each replenisher.

Therefore, according to the present embodiment, the supply rate of each replenisher Cu, NaOH or HCHO can be optimally controlled constantly depending on the concentration change of the each replenisher in a plating solution, and an excellent control of plating solution become possible even in high speed plating.

In addition, in the fuzzy inference of the supply rate correction value of certain replenisher, the present embodiment takes into account the current supply rates of other replenishers and, therefore, can control the plating solution synthetically. That is, in case where each replenisher influences another, in the conventional method, the addition of each replenisher is moderated according to the experimental know-how of persons skilled to the art; whereas, in the present embodiment, plating solution can be controlled according to the fuzzy rules described above incorporated with the experimental know-how of persons skilled to the art.

Furthermore, the present embodiment employs triangular or trapezoidal membership function as membership function. However, the shape of the membership function to be employed may vary depending on the control specification, and any shape may be employed so as to no contradiction occurs in operation, such as bell-shaped type.

The fuzzy rules employed in the present embodiment are just a part of those able to be employed. By further adding another input variables, more suitable control of plating solution becomes possible. For example, in the embodiment described above, temperature, Ph of plating solution, and the like are not incorporated as input variables. However, by incorporating such factors as input variables to add new fuzzy rules and/or membership functions, plating solution can be controlled more suitably.

Although the present embodiment is described in connection with a plating apparatus for electroless copper plating, the present invention is applicable to other plating apparatuses in which plating components are different, to control concentration of each components optimally. In addition, although the present embodiment is also described in connection with an apparatus for constant supply of replenishers in which each replenisher is controlled of its supply rate, the present invention is also applicable to apparatuses for periodical supply of replenishers in which the supply amount of each replenisher at the time of supply is controlled, to give same effects described above.

Industrial Applicability

As described above, according to the present invention, detection of concentration of components in plating solution can be carried out in a useful manner for excellent plating, particularly in plating using a plating bath where the plating rate is high.

We claim:

1. A concentration detection method for detecting the concentration of a predetermined component in a chemical treating solution, the method comprising the steps of:
   sampling the chemical treating solution at a first time to obtain a first sampled solution, and analyzing, in a first analysis, the first sampled solution for first concentration information corresponding to a first concentration of the predetermined component in the chemical treating solution at the first time, and
   sampling the chemical treating solution at a second time when a predetermined time has elapsed from the first time to obtain a second sampled solution, and analyzing, in a second analysis, the second sampled solution for second concentration information corresponding to a second concentration of said predetermined component at the second of time; and
   calculating a third concentration of the predetermined component in the chemical treating solution after another predetermined time has elapsed from the second time, said calculating being based on the first and second concentration information and on the times required for said first analysis and said second analysis.

2. The concentration detection method according to claim 1, wherein the third concentration is a concentration of the predetermined component in the chemical treating solution at the time when the time required for obtaining said second concentration information has elapsed from said second time.

3. A concentration detection apparatus for detecting the concentration of a predetermined component in a chemical treating solution, the apparatus comprising:
   analytical means in which the chemical treating solution is sampled, and in which the sampled solution is analyzed in a first analysis to obtain first concentration information corresponding to a first concentration of the predetermined component in the chemical treating solution at a first analyzing time and is analyzed in a second analysis to obtain second concentration information corresponding to a second concentration of said predetermined component at a second analyzing time when a predetermined time has elapsed from the first analyzing time;
   concentration calculating means for calculating a third concentration of the predetermined component in the chemical treating solution when another predetermined time has elapsed from the second analyzing time, said third concentration being based on the first and second concentration information and on the time required for said first analysis and said second analysis.

4. The concentration detection apparatus according to claim 3, wherein the third concentration of said predetermined component is a concentration at the time when the time required for obtaining said second concentration information has elapsed from said second analyzing time.

5. A concentration detection apparatus for detecting the concentration of a predetermined component in a chemical treating solution, the apparatus comprising:
   analytical means for sampling the chemical treating solution periodically, and for subsequently analyzing the predetermined component concentration in the chemical treating solution;
   changing rate calculating means for calculating a changing rate of said predetermined component concentration in the chemical treating solution, based on:
      a difference between a first concentration of said predetermined component and a second concentration of said predetermined component, said second concentration being measured at a predetermined time after measurement of said first concentration and on
      a time difference between a time required for sampling of said chemical treating solution to obtain said first concentration and a time required for sampling of said chemical treating solution to obtain said second concentration;
   changing amount calculating means for calculating a third concentration at a third predetermined time, said third concentration being based on the changing rate calculated by the changing rate calculating means and on a time difference between said second predetermined time and the third predetermined time when a predetermined time has elapsed since said second predetermined time; and
   correcting means for outputting at said third predetermined time the third concentration result calculated by the changing amount calculating means into said chemical treating solution as said predetermined component concentration.

6. An automatic control apparatus for a chemical treating solution, the apparatus comprising:
   analytical means for sampling the chemical treating solution periodically, and for subsequently analyzing a predetermined component concentration in the chemical treating solution;
   changing rate calculating means for calculating a changing rate of said predetermined component concentration in the chemical treating solution, based on:
      the difference between a first concentration of said predetermined component and a second concentration of said predetermined component, said second concentration being measured at a predetermined time after said first concentration and on
      a time difference between a first time required for sampling of said chemical treating solution to obtain said first concentration and a second time required for sampling of said chemical treating solution to obtain said second concentration;
   changing amount calculating means for calculating a third concentration at a third predetermined time, based on the changing rate calculated by the changing rate calculating means and on a time difference between said second predetermined time and the third predetermined time when a predetermined time has elapsed since said second predetermined time;

correcting means for outputting the third concentration result calculated by the changing amount calculating means into said chemical treating solution as said predetermined component concentration;

concentration detection means for detecting the second concentration information of the predetermined component consumed by chemical treatment in the chemical treating solution contained in a chemical treatment vessel;

supply means for supplying the predetermined component based on its detected concentration by the concentration detection means into the chemical treating vessel as a replenisher;

control amount calculating means for calculating a supply rate or a supply amount of the replenisher by said supply means, based on the second concentration of said predetermined component calculated by said changing amount calculating means and said third concentration of said predetermined component calculated by said changing amount calculating means; and supply control means for controlling driving of said supply means depending on the supply rate or supply amount calculated by the control amount calculating means.

7. A concentration detection method for detecting the concentration of a predetermined component in a chemical treating solution, the method comprising the steps of:

detecting first concentration information corresponding to a first concentration of the predetermined component in the chemical treating solution at a first analyzing time and second concentration information corresponding to a second concentration of said predetermined component in the chemical treating solution at a second analyzing time where a predetermined time has elapsed from said first analyzing time;

memorizing a plurality of rules based on said first concentration information and on said second concentration information and a plurality of functions partitioning said first concentration information and said second concentration information in said plurality of rules into sets having predetermined ranges and also setting certainty factors in the partitioned sets, and then operating each certainty factor in said plurality of rules; and setting a command value in a third concentration of said predetermined component in said chemical treating solution from the certainty factors, and then supplying said predetermined component to said chemical treating solution according to the command value of said third concentration.

8. The concentration detection method according to claim 7, wherein the plurality of rules comprises a plurality of concentration information of the predetermined component, including pluralities of first and second concentration information, said pluralities of first concentration information and second concentration information in said plurality of rules being partitioned into sets having predetermined ranges, and wherein the functions set with the certainty factors in the partitioned sets are memorized.

9. A concentration detection apparatus for detecting the concentration of a predetermined component in a chemical treating solution, said apparatus comprising:

analytical means for detecting first concentration information corresponding to a first concentration of the predetermined component in the chemical treating solution at a first analyzing time and second concentration information corresponding to a second concentration of said predetermined component in the chemical treating solution at a second analyzing time where a predetermined time has elapsed from said first analyzing time;

memory means for memorizing
a plurality of rules set based on said first concentration information and on said second concentration information and
functions partitioning said first concentration information and said second concentration information in said plurality of rules into sets having predetermined ranges and also setting certainty factors in the partitioned sets; and setting means for operating each certainty factor in said plurality of rules, and then setting the command value in concentration of said predetermined component in said chemical treating solution from the certainty factors.

10. The concentration detection apparatus according to claim 9, wherein the plurality of rules memorized in said memory means comprise plural concentration information of the predetermined component, and wherein said memory means memorizes said rules and functions set with the certainty factors in the sets having predetermined ranges into which said plural first concentration information and second concentration information are partitioned.

11. An automatic control apparatus for a chemical treating solution for use in a chemical treatment, the apparatus comprising:

supply means for supplying each component consumable by the chemical treatment in the chemical treating solution consisting of a plurality of components as a replenisher into a chemical treatment vessel containing the chemical treating solution;

condition input means for memorizing a command concentration of said replenisher in said chemical treating solution and chemical treatment conditions of material to be chemically treated;

control amount calculating means for calculating a supply rate or a supply amount of said replenisher to be supplied by said supply means based on the command concentration of each replenisher in the chemical treating solution and the chemical treatment conditions of the material to be chemically treated, both memorized in the condition input means;

supply control means for controlling the supply rate or the supply amount of each replenisher from said supply means into said chemical treatment vessel, depending on the supply rate or the supply amount calculated by the control amount calculating means;

concentration analyzing means for analyzing each replenisher in said chemical treating solution independently;

concentration changing amount calculating means for calculating a changing amount per unit time of concentration of each replenisher based on the analyzed result by the concentration analyzing means;

memory means for memorizing a plurality of rules set based on deviations between the concentration of each replenisher analyzed in said concentration analyzing means and the command concentration, the changing amount of each replenisher concentration calculated by said concentration changing amount calculating means and the correction amount of the supply rate or the supply amount of each replenisher, and functions partitioning the deviations of each replenisher concentration from the command concentration analyzed by said concentration analyzing means in said plurality of rules, the changing amount of the each replenisher concentration calculated in said concentration changing amount calculating means and the correction amount of the supply rate or the supply amount of each replenisher into sets having predetermined ranges and setting certainty factors in partitioned sets;

correction amount calculating means for operating each certainty factor in said plurality of rules and for calculating the supply rate or the supply amount of each replenisher from the resulting certainty factor; and control amount update means for correcting the supply rate or the supply amount calculated by said control amount calculating means based on the correction amount calculated by said correction amount calculating means, to change the supply rate or the supply amount of each replenisher controlled by said supply control means.

* * * * *